(12) United States Patent
Wang et al.

(10) Patent No.: US 10,916,371 B2
(45) Date of Patent: *Feb. 9, 2021

(54) WIRELESS POWER TRANSMISSION DEVICE AND ELECTRICAL APPARATUS

(71) Applicant: Tyco Electronics (Shanghai) Co. Ltd., Shanghai (CN)

(72) Inventors: Shaoyong Wang, Shanghai (CN); Feng Dai, Shanghai (CN); Yuming Song, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 211 days.

This patent is subject to a terminal disclaimer.

(21) Appl. No.: 15/963,717

(22) Filed: Apr. 26, 2018

(65) Prior Publication Data

US 2018/0248587 A1    Aug. 30, 2018

Related U.S. Application Data

(63) Continuation of application No. PCT/IB2016/056413, filed on Oct. 25, 2016.

(30) Foreign Application Priority Data

Oct. 26, 2015   (CN) .................... 2015 2 0835503 U

(51) Int. Cl.
*H01F 38/14* (2006.01)
*H02J 50/90* (2016.01)
(Continued)

(52) U.S. Cl.
CPC .............. *H01F 38/14* (2013.01); *H02J 50/10* (2016.02); *H02J 50/90* (2016.02); *H04B 5/0037* (2013.01); *H01F 27/24* (2013.01)

(58) Field of Classification Search
CPC . H01F 38/14; H02J 5/005; H02J 7/025; H02J 17/00; B60L 53/12–126
See application file for complete search history.

(56) References Cited

U.S. PATENT DOCUMENTS 5,680,028 A * 10/1997 McEachern ............ A61C 17/22
                                                            320/108
5,741,316 A    4/1998 Chen et al.
(Continued)

FOREIGN PATENT DOCUMENTS

CH              696020 A5 * 11/2006 .......... A47L 15/4293
CN     201520835503.0 U    4/2016
(Continued)

OTHER PUBLICATIONS

PCT Notification of Transmittal of the International Search Report and the Written Opinion of the International Searching Authority, or the Declaration, International Search Report, and Written Opinion of the International Searching Authority, dated Jan. 27, 2017, 11 pages.
(Continued)

*Primary Examiner* — Rexford N Barnie
*Assistant Examiner* — David A Shiao

(57) ABSTRACT

A wireless power transmission device comprises a transmitting coil assembly and a receiving coil assembly. The transmitting coil assembly includes a first magnetic core and a transmitting coil winding. The first magnetic core has a substantial U-shaped body portion, a first pillar portion disposed at a first end of the U-shaped body portion, and a second pillar portion disposed at a second end of the U-shaped body portion. The transmitting coil winding has a first transmitting coil winding wound around the first pillar portion and a second transmitting coil winding wound around the second pillar portion. The receiving coil assembly is interposed between the first pillar portion and the (Continued)

second pillar portion and electromagnetically coupled therewith. The receiving coil assembly includes a second magnetic core and a receiving coil winding.

19 Claims, 2 Drawing Sheets

(51) Int. Cl.
    *H02J 50/10*         (2016.01)
    *H04B 5/00*         (2006.01)
    *H01F 27/24*       (2006.01)

(56) References Cited

U.S. PATENT DOCUMENTS

| | | | | |
|---|---|---|---|---|
| 6,028,413 | A * | 2/2000 | Brockmann | H02J 50/60 320/108 |
| 6,150,794 | A * | 11/2000 | Yamada | H02J 50/90 320/108 |
| 6,445,270 | B1 * | 9/2002 | Ogasawara | H01F 38/14 336/182 |
| 7,211,986 | B1 * | 5/2007 | Flowerdew | H02J 7/025 320/108 |
| 2002/0118004 | A1 * | 8/2002 | Scheible | H01F 5/00 323/371 |
| 2007/0285819 | A1 * | 12/2007 | Gerhardinger | H01F 38/14 360/48 |
| 2011/0068888 | A1 * | 3/2011 | Ger | H01F 27/324 336/220 |
| 2011/0086256 | A1 * | 4/2011 | Julstrom | H02J 50/12 429/121 |
| 2011/0248673 | A1 * | 10/2011 | Aerts | H02J 7/0044 320/108 |
| 2012/0126924 | A1 * | 5/2012 | Balog | H01F 38/14 336/58 |
| 2012/0235788 | A1 * | 9/2012 | Lakirovich | H02J 50/12 340/5.64 |
| 2013/0038281 | A1 * | 2/2013 | Sakakibara | H02J 7/025 320/108 |
| 2014/0183966 | A1 * | 7/2014 | Suzuki | H01F 38/14 307/104 |
| 2015/0015079 | A1 * | 1/2015 | Ohta | H01F 30/16 307/104 |
| 2016/0359372 | A1 * | 12/2016 | Lee | H02J 7/025 |
| 2017/0018947 | A1 * | 1/2017 | Chien | H02J 7/025 |
| 2017/0179728 | A1 * | 6/2017 | Jiang | H01F 38/14 |
| 2018/0198319 | A1 * | 7/2018 | Wang | H02J 50/12 |

FOREIGN PATENT DOCUMENTS

| | | | |
|---|---|---|---|
| JP | 10-4639 A | 1/1998 | |
| JP | 2005137173 A | 5/2005 | |
| WO | 2008043264 A1 | 4/2008 | |
| WO | WO-2015172665 A1 * | 11/2015 | ......... H01F 27/2823 |
| WO | 2017072659 A1 | 5/2017 | |

OTHER PUBLICATIONS

Abstract of JP 2005137173, dated Oct. 31, 2003 1 page.
Abstract of JP 10-4639, dated Jan. 6, 1998, 1 page.

* cited by examiner

WIRELESS POWER TRANSMISSION DEVICE AND ELECTRICAL APPARATUS

CROSS-REFERENCE TO RELATED APPLICATIONS

This application is a continuation of PCT International Application No. PCT/IB2016/056413, filed on Oct. 25, 2016, which claims priority under 35 U.S.C. § 119 to Chinese Patent Application No. 201520835503.0, filed on Oct. 26, 2015.

FIELD OF THE INVENTION

The present invention relates to a power transmission device and, more particularly, to a wireless power transmission device.

BACKGROUND

In some applications, such as in household appliances, it is desirable for a user to conveniently detach a component such as a cover, a door, or the like of the household appliance for cleaning. The cover or the door has an interface such as a display screen or a press key. Conventionally, a body of the household appliance is connected with the cover or the door by an electrical wire to power the interface. Due to this wired power transmission, the user must detach a connector for connecting the electrical wire when detaching the cover or the door. Cleaning the cover or the door which receives wired power consequently creates a short-circuit risk; a wireless transmission of power is more desirable.

The effectiveness of wireless power transmission depends on sizes of coil assemblies, a distance between the coil assemblies, and a motion between the coil assemblies. When applied on a cover or door of a household appliance, a receiving coil assembly should be small enough to be conveniently incorporated into or removed from a transmitting coil assembly.

A known wireless power transmission device is shown in FIG. 1. The wireless power transmission device comprises a transmitting coil assembly 10 and a receiving coil assembly 20 magnetically coupled with the transmitting coil assembly 10. The transmitting coil assembly 10 includes a cylindrical first magnetic core 11 and a first coil winding 12 wound around one end of the first magnetic core 11. The receiving coil assembly 20 includes a cylindrical second magnetic core 21 and a second receiving coil winding 22 wound around one end of the second magnetic core 21. The transmitting coil assembly 10 is arranged opposite to and coaxial with the receiving coil assembly 20. Further, the transmitting coil assembly 10 is electromagnetically coupled with the receiving coil assembly 20 so as to achieve a wireless power transmission therebetween.

Although the coil structure shown in FIG. 1 is very simple, when an outer diameter of the coil windings 12, 22 is no more than 15 mm, the device only achieves an output voltage of 12V and a maximal output power of 5 W when a distance between the coil windings 12, 22 is less than 3 mm. The small outer diameters result in a very small coupling coefficient between the coil windings 12, 22 when the space is larger than 3 mm.

SUMMARY

A wireless power transmission device comprises a transmitting coil assembly and a receiving coil assembly. The transmitting coil assembly includes a first magnetic core and a transmitting coil winding. The first magnetic core has a substantial U-shaped body portion, a first pillar portion disposed at a first end of the U-shaped body portion, and a second pillar portion disposed at a second end of the U-shaped body portion. The transmitting coil winding has a first transmitting coil winding wound around the first pillar portion and a second transmitting coil winding wound around the second pillar portion. The receiving coil assembly is interposed between the first pillar portion and the second pillar portion and electromagnetically coupled therewith. The receiving coil assembly includes a second magnetic core and a receiving coil winding.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
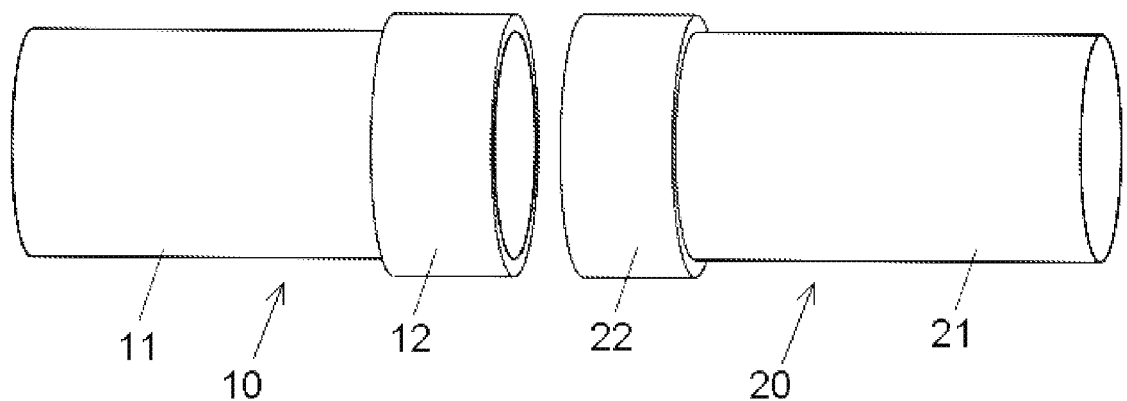
FIG. 1 is a perspective view of a known wireless power transmission device.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

Figure 2:
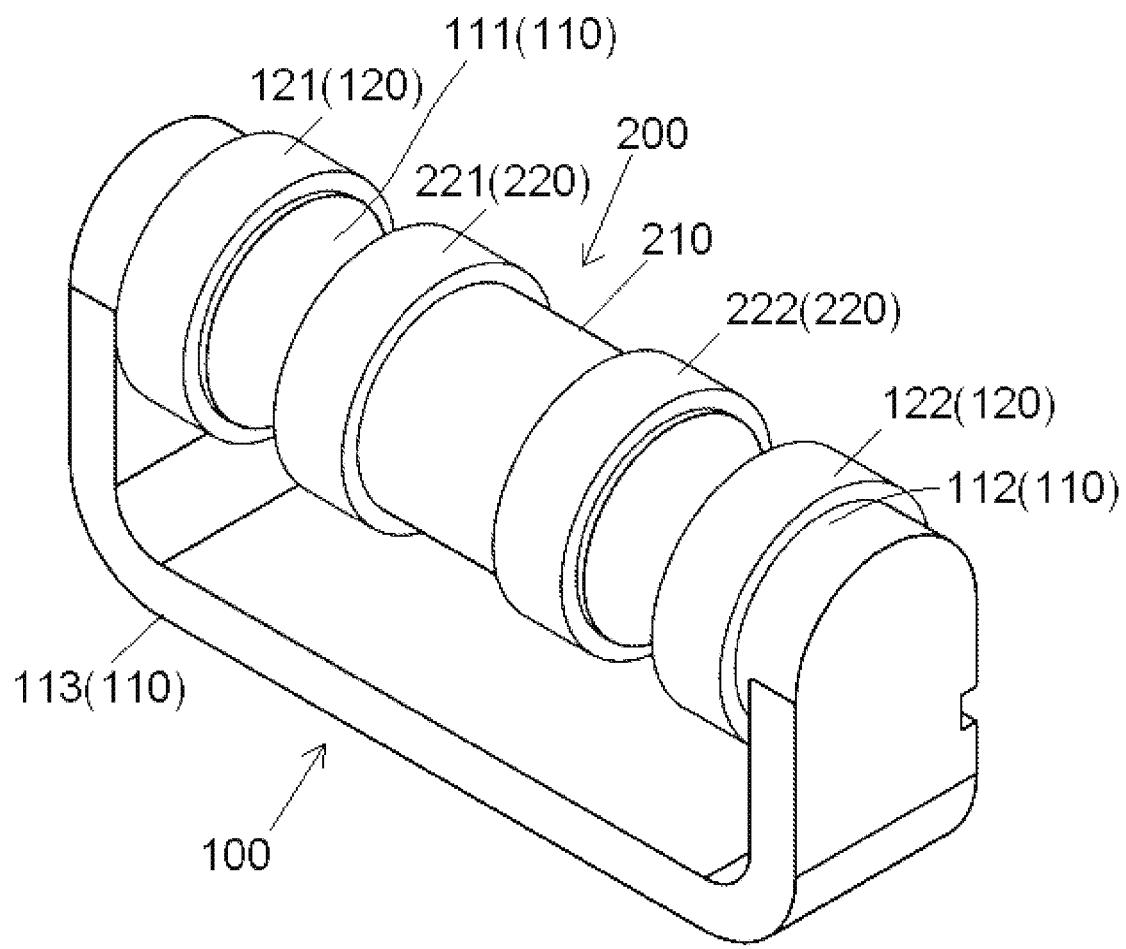
FIG. 2 is a perspective view of a wireless power transmission device according to an embodiment.

A wireless power transmission device according to an embodiment is shown in FIG. 2. The wireless power transmission device comprises a transmitting coil assembly 100 and a receiving coil assembly 200. The receiving coil assembly 200 is adapted to be electromagnetically coupled with the transmitting coil assembly 100 in a non-contact manner to receive power for a power consumption device, such as an electronic device.

The transmitting coil assembly 100, as shown in FIG. 2, has a first magnetic core 110 and transmitting coil windings 120 wound around the first magnetic core 110.

The first magnetic core 110 includes a substantial U-shaped body portion 113, a first pillar portion 111, and a second pillar portion 112. The U-shaped body portion 113 includes a plate-like bottom and a pair of plate-like side arms located at both ends of the plate-like bottom.

The first pillar portion 111 is disposed at a first free end of the U-shaped body portion 113 and the second pillar portion 112 is disposed at a second free end of the U-shaped body portion 113 opposite the first free end. The first pillar portion 111 and the second pillar portion 112 extend toward each other. The first pillar portion 111 and the second pillar portion 112 protrude inwardly toward an opening of the U-shaped body portion 113 and face each other. In the embodiment shown in FIG. 2, the first pillar portion 111 is arranged coaxial with the second pillar portion 112 and has a same diameter as that of the second pillar portion 112.

In an embodiment, a width of the U-shaped body portion 113 is substantially equal to the diameter of each of the first pillar portion 111 and the second pillar portion 112. A length of the U-shaped body portion 113 of the first magnetic core 110 is no more than 48 mm, and the width thereof is no more than 14 mm. An outer diameter of the transmitting coil winding 120 is no more than 14 mm, and an overall height of the transmitting coil assembly 100 is no more than 23 mm. In other embodiments, the sizes of the first magnetic core 110 and the transmitting coil windings 120 are not limited to those described herein and may be adjusted as desired.

The transmitting coil windings 120 include a first transmitting coil winding 121 wound around the first pillar portion 111 and a second transmitting coil winding 122 wound around the second pillar portion 112. The first transmitting coil winding 121 and the second transmitting coil winding 122 are electrically connected with each other in series, so that current flows in the same direction in the first transmitting coil winding 121 and the second transmitting coil winding 122.

In an embodiment, the first transmitting coil winding 121 and the second transmitting coil winding 122 are formed by winding a single wire such as a varnished wire. In another embodiment, the first transmitting coil winding 121 and the second transmitting coil winding 122 are formed by winding two separated wires, and the first transmitting coil winding 121 and the second transmitting coil winding 122 are then electrically connected with each other in series by one wire. A winding direction of the first transmitting coil winding 121 may be the same as or different from that of the second transmitting coil winding 122, as long as the current flows in the same direction in the first transmitting coil winding 121 and the second transmitting coil winding 122.

The receiving coil assembly 200, as shown in FIG. 2, has a second magnetic core 210 and receiving coil windings 220 wound around the second magnetic core 210. The second magnetic core 210 has a cylindrical shape. The receiving coil windings 220 include a first receiving coil winding 221 wound around a first end of the second magnetic core 210 and a second receiving coil winding 222 wound around a second end of the second magnetic core 210 opposite the first end. The first receiving coil winding 221 and the second receiving coil winding 222 are electrically connected with each other in series, so that current flows in the same direction in the first receiving coil winding 221 and the second receiving coil winding 222.

In an embodiment, the first receiving coil winding 221 and the second receiving coil winding 222 are formed by winding a single wire such as a varnished wire. In another embodiment, the first receiving coil winding 221 and the second receiving coil winding 222 are formed by winding two separated wires, and the first receiving coil winding 221 and the second receiving coil winding 222 are then electrically connected with each other in series by one wire. A winding direction of the first receiving coil winding 221 may be the same as or different from that of the second receiving coil winding 222, as long as the current flows in the same direction in the first transmitting coil winding 121 and the second transmitting coil winding 122.

The second magnetic core 210, as shown in FIG. 2, has a length smaller than a space between the first pillar portion 111 and the second pillar portion 112. In the embodiment shown in FIG. 2, a diameter of the second magnetic core 210 is substantially equal to that of each of the first pillar portion 111 and the second pillar portion 112 of the first magnetic core 110. The receiving coil assembly 200 is adapted to be interposed between the first pillar portion 111 and the second pillar portion 112 of the transmitting coil assembly 100 so as to achieve electromagnetic coupling with the transmitting coil assembly 100. The electromagnetic coupling between the transmitting coil assembly 100 and the receiving coil assembly 200 remains sufficient to transfer power when a space between the receiving coil windings 220 and the transmitting coil windings 120 is increased to 5 mm.

In an embodiment, the length of the second magnetic core 210 is no more than 20 mm, and an outer diameter of the receiving coil winding 220 is no more than 14 mm. In other embodiments, the sizes of the second magnetic core 210 and the receiving coil windings 220 are not limited to those described herein and may be adjusted as desired.

In another embodiment, an electrical apparatus comprises a machine body, a cover plate, and the wireless power transmission device. The cover plate is rotatably mounted on the machine body. The transmitting coil assembly 100 of the wireless power transmission device is mounted on one of the machine body and the cover plate, and the receiving coil assembly 200 is mounted on the other of the machine body and the cover plate. Both the transmitting coil assembly 100 and the receiving coil assembly 200 are mounted at a position close to a rotation axis of the cover plate.

When the cover plate is rotated to a closed position relative to the machine body, the receiving coil assembly 200 is interposed between the first pillar portion 111 and the second pillar portion 112 of the transmitting coil assembly 100 and electromagnetically coupled therewith, thereby transferring power within the electrical apparatus. When the cover plate is rotated to an open position relative to the machine body, the receiving coil assembly 200 is moved outside the transmitting coil assembly 100 and electromagnetically discoupled therefrom, thereby stopping the transfer of power in the electrical apparatus.

In an embodiment, the electrical apparatus is a household appliance such as a washing machine or a refrigerator. In an embodiment, the transmitting coil assembly 100 is mounted on the machine body and the receiving coil assembly 200 is mounted on the cover plate, so that the electronic product mounted on the cover plate is powered. The electronic product mounted on the cover plate, in various embodiments, includes at least one of a display screen, a lamp and a press key. In order to mount the transmitting coil assembly 100 and the receiving coil assembly 200 on the household appliance, both the transmitting coil assembly 100 and the receiving coil assembly 200 are designed very small in size as described above. In order to power the electronic product including the display screen, the lamp, or the press key mounted on the cover plate, the wireless power transmission device supports enough power supply voltage and supplied power. In an embodiment, the above wireless power transmission device may provide a rated power supply voltage no less than 12V and a rated power no less than 5 W.

What is claimed is:
1. A wireless power transmission device, comprising:
 a transmitting coil assembly comprising:
  a first magnetic core having a substantially U-shaped body portion, a first pillar portion disposed at a first end of the U-shaped body portion, and a second pillar portion disposed at a second end of the U-shaped body portion opposite the first end, the first pillar portion and the second pillar portion extending toward each other; and
  a transmitting coil winding having a first transmitting coil winding wound around the first pillar portion and a second transmitting coil winding wound around the second pillar portion, the first transmitting coil winding and the second transmitting coil winding electrically connected with each other in series; and a receiving coil assembly adapted to be interposed between the first pillar portion and the second pillar portion and electromagnetically coupled with the transmitting coil assembly, the receiving coil assembly comprising:
  a second magnetic core; and
  a receiving coil winding having a first receiving coil winding wound around a first end of the second magnetic core and a second receiving coil winding wound around a second end of the second magnetic core opposite the first end, the first receiving coil winding and the second receiving coil winding electrically connected with each other in series, wherein no coil windings are wound around a central portion of the second magnetic core between the first receiving coil winding and the second receiving coil winding.

2. The wireless power transmission device of claim 1, wherein current flows in a same direction in the first transmitting coil winding and the second transmitting coil winding.

3. The wireless power transmission device of claim 1, wherein the first pillar portion and the second pillar portion each have a circular cross-section, and wherein the first pillar portion is arranged coaxial with the second pillar portion and the first pillar portion has a same diameter as the second pillar portion.

4. The wireless power transmission device of claim 3, wherein a diameter of the second magnetic core is equal to a diameter of each of the first pillar portion and the second pillar portion of the first magnetic core.

5. The wireless power transmission device of claim 4, wherein the U-shaped body portion of the first magnetic core includes a plate-like bottom and a pair of plate-like side arms each disposed at respective ends of the plate-like bottom.

6. The wireless power transmission device of claim 5, wherein a width of the U-shaped body portion is substantially equal to the diameter of each of the first pillar portion and the second pillar portion.

7. The wireless power transmission device of claim 6, wherein a length of the U-shaped body portion is no more than 48 mm and the width of the U-shaped body portion is no more than 14 mm.

8. The wireless power transmission device of claim 7, wherein an outer diameter of the transmitting coil winding is no more than 14 mm and an overall height of the transmitting coil assembly is no more than 23 mm.

9. The wireless power transmission device of claim 8, wherein a length of the second magnetic core is no more than 20 mm and an outer diameter of the receiving coil winding is no more than 14 mm.

10. The wireless power transmission device of claim 1, wherein the first transmitting coil winding and the second transmitting coil winding are formed by winding a single wire.

11. The wireless power transmission device of claim 1, wherein the first transmitting coil winding and the second transmitting coil winding are formed by winding a pair of separate wires.

12. The wireless power transmission device of claim 1, wherein a winding direction of the first receiving coil winding is different from a winding direction of the second receiving coil winding.

13. An electrical apparatus, comprising:
a machine body;
a cover plate rotatably mounted on the machine body; and
a wireless power transmission device including:
  a transmitting coil assembly mounted on one of the machine body and the cover plate and comprising:
    a first magnetic core having a substantially U-shaped body portion, a first pillar portion disposed at a first end of the U-shaped body portion, and a second pillar portion disposed at a second end of the U-shaped body portion opposite the first end, the first pillar portion and the second pillar portion extending toward each other; and
    a transmitting coil winding having a first transmitting coil winding wound around the first pillar portion and a second transmitting coil winding wound around the second pillar portion, the first transmitting coil winding and the second transmitting coil winding electrically connected with each other in series; and
  a receiving coil assembly mounted on the other of the machine body and the cover plate, the receiving coil assembly is interposed between the first pillar portion and the second pillar portion and electromagnetically coupled with the transmitting coil assembly when the cover plate is rotated to a closed position relative to the machine body, and is moved outside of the transmitting coil assembly and electromagnetically decoupled from the transmitting coil assembly when the cover plate is rotated to an open position relative to the machine body, the receiving coil assembly comprising:
    a second magnetic core; and
    a receiving coil winding having a first receiving coil winding wound around a first end of the second magnetic core and a second receiving coil winding wound around a second end of the second magnetic core opposite the first end, the first receiving coil winding and the second receiving coil winding electrically connected with each other in series.

14. The electrical apparatus of claim 13, wherein both the transmitting coil assembly and the receiving coil assembly are mounted at a position close to a rotation axis of the cover plate.

15. The electrical apparatus of claim 14, wherein the electrical apparatus is a household appliance.

16. The electrical apparatus of claim 15, wherein the transmitting coil assembly is mounted on the machine body and the receiving coil assembly is mounted on the cover plate, the transmitting coil assembly and receiving coil assembly powering an electronic product mounted on the cover plate.

17. The electrical apparatus of claim 16, wherein the electronic product is at least one of a display screen, a lamp, and a press key.

18. The electrical apparatus of claim 17, wherein the wireless power transmission device has a rated power supply voltage no less than 12V and a rated power no less than 5 W.

19. An electrical apparatus, comprising:
a machine body;
a cover plate moveably mounted on the machine body; and
a wireless power transmission device including:
  a transmitting coil assembly mounted on one of the machine body and the cover plate and comprising:
    a first magnetic core having a substantially U-shaped body portion, a first pillar portion disposed at a first end of the U-shaped body portion, and a second pillar portion disposed at a second end of the U-shaped body portion opposite the first end, the first pillar portion and the second pillar portion extending toward each other; and a transmitting coil winding having a first transmitting coil winding wound around the first pillar portion and a second transmitting coil winding wound around the second pillar portion, the first transmitting coil winding and the second transmitting coil winding electrically connected with each other in series; and a receiving coil assembly mounted on the other of the machine body and the cover plate, the receiving coil assembly is interposed between the first pillar portion and the second pillar portion and electromagnetically coupled with the transmitting coil assembly when the cover plate is moved into a closed position relative to the machine body, and is moved outside of the transmitting coil assembly and electromagnetically decoupled from the transmitting coil assembly when the cover plate is moved to an open position relative to the machine body, the receiving coil assembly comprising:

a second magnetic core; and a receiving coil winding having a first receiving coil winding wound around a first end of the second magnetic core and a second receiving coil winding wound around a second end of the second magnetic core opposite the first end, the first receiving coil winding and the second receiving coil winding electrically connected with each other in series.

* * * * *